Aug. 23, 1960     G. B. LOPER ET AL     2,950,459
SEISMIC RECORD DISPLAY AND RE-RECORDING
Original Filed Aug. 30, 1951     6 Sheets-Sheet 1

GEORGE B. LOPER
ROBERT R. PITTMAN
INVENTORS

BY *D. Carl Richards*
ATTORNEY

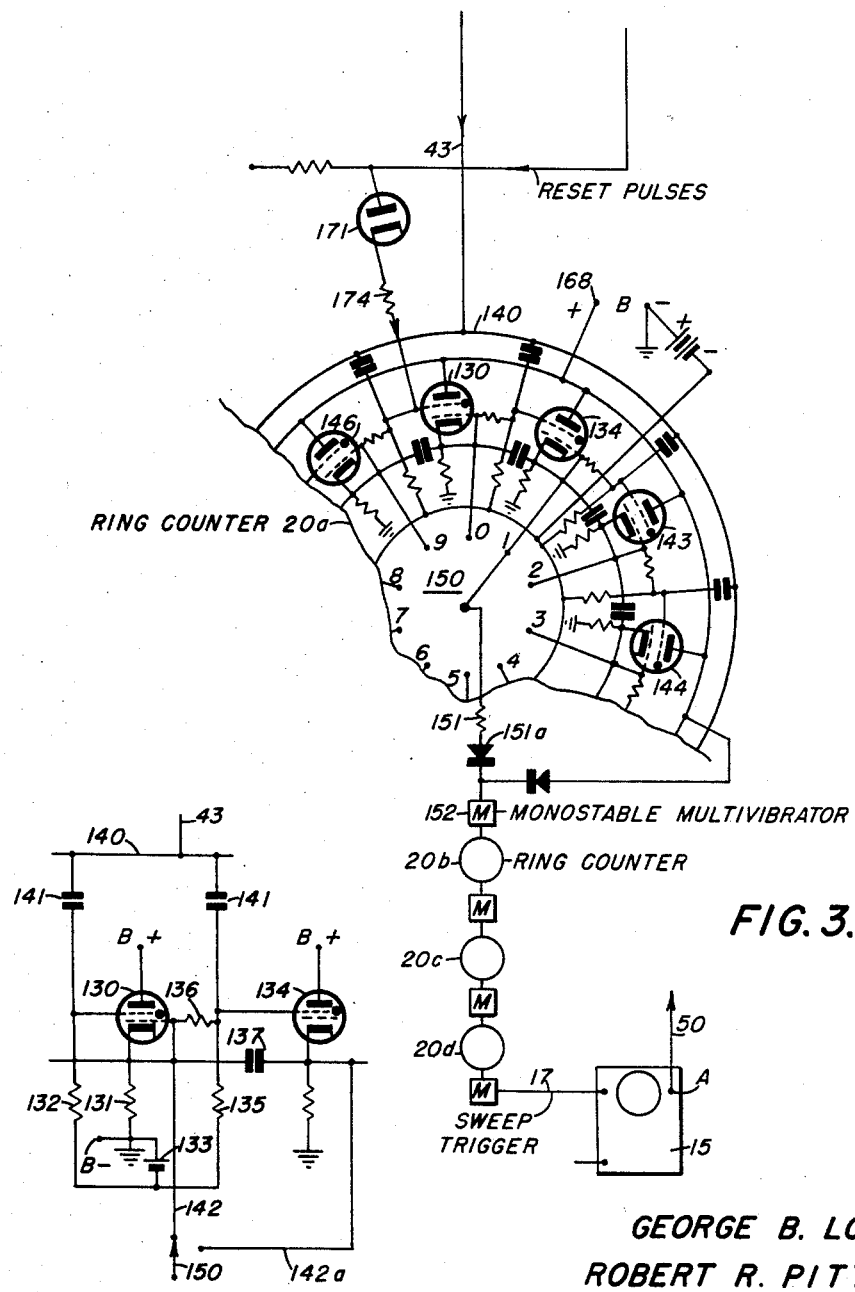

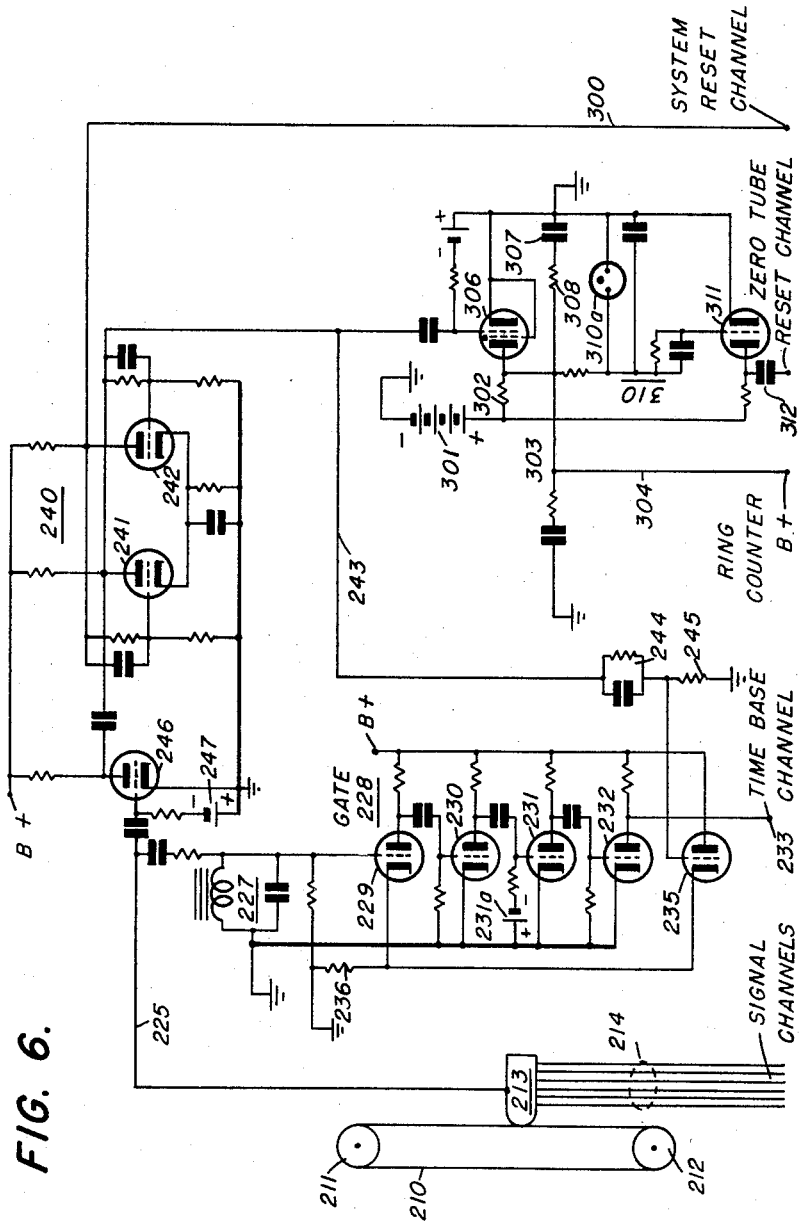

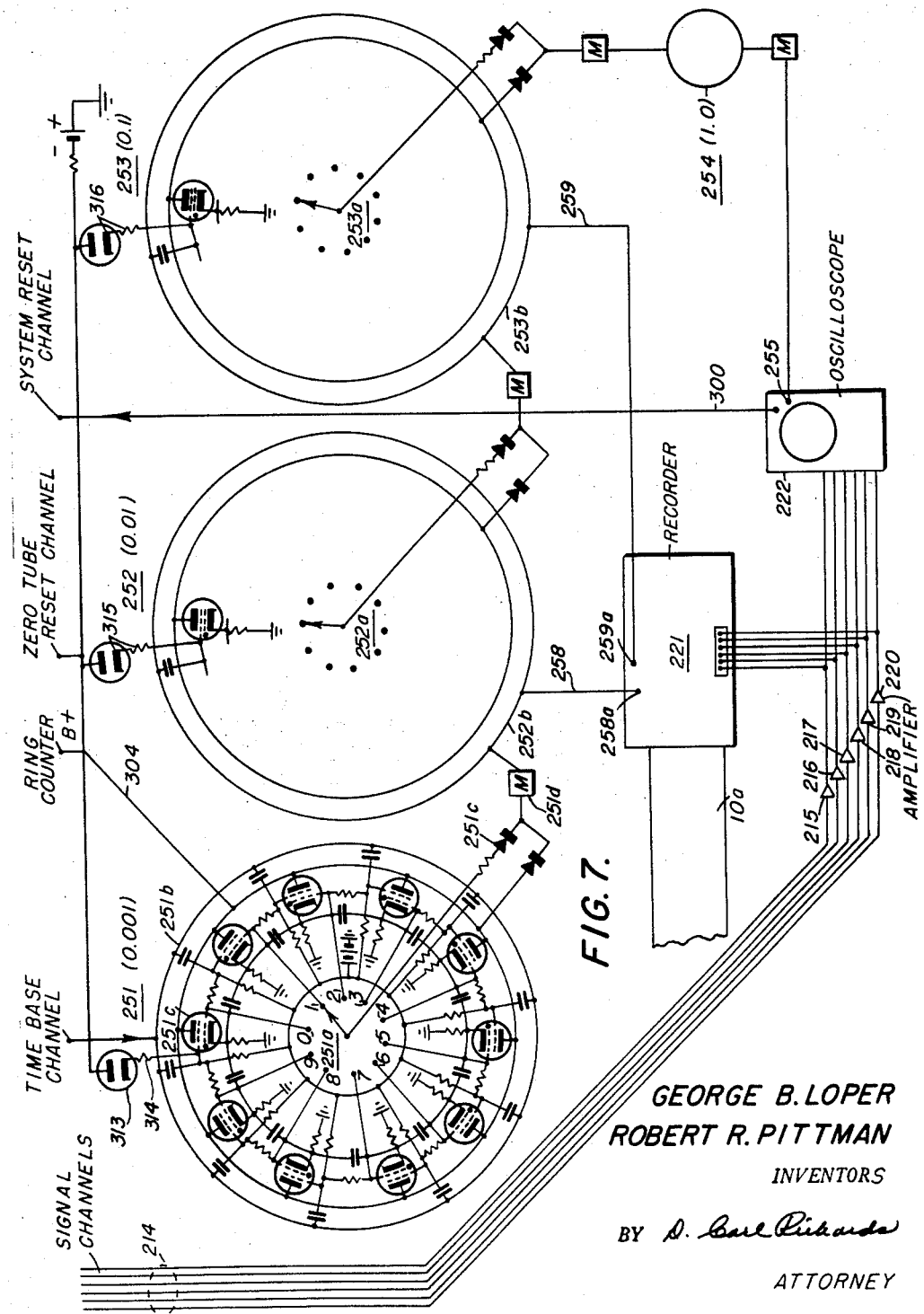

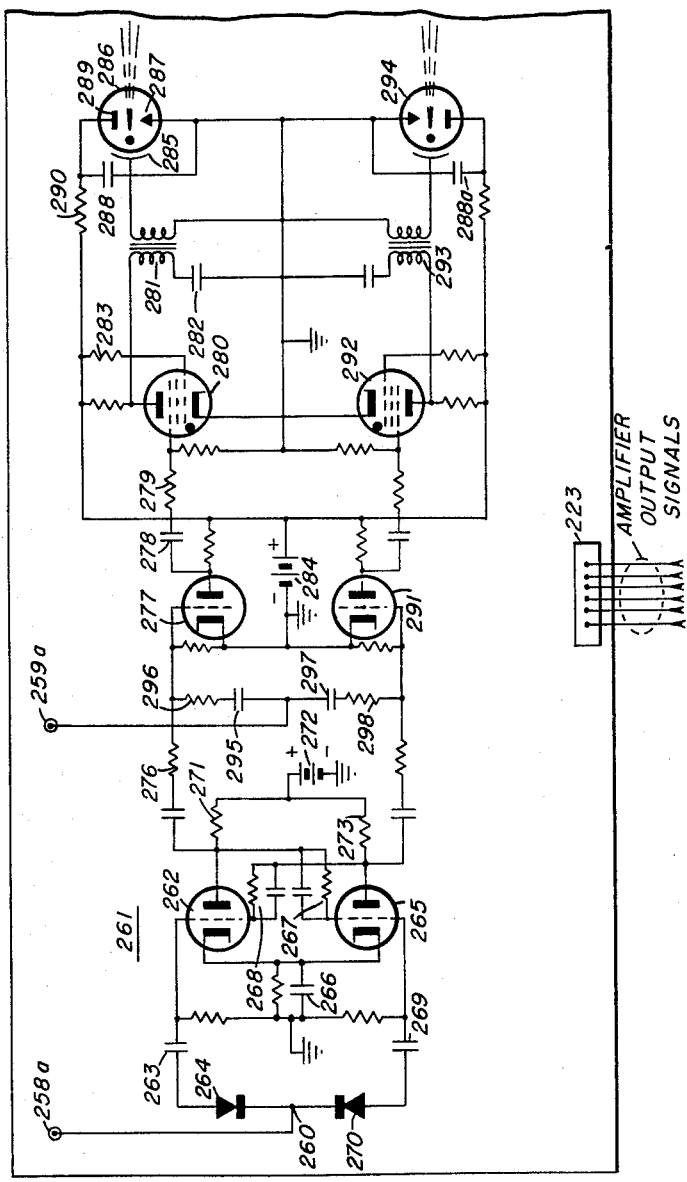

United States Patent Office 2,950,459
Patented Aug. 23, 1960

2,950,459

SEISMIC RECORD DISPLAY AND RE-RECORDING

George B. Loper, Dallas, Tex., and Robert R. Pittman, Tulsa, Okla., assignors, by mesne assignments, to Socony Mobil Oil Company, Inc., a corporation of New York Continuation of applications Ser. No. 244,386, Aug. 30, 1951, and Ser. No. 297,804, July 9, 1952. This application Oct. 27, 1953, Ser. No. 388,582

25 Claims. (Cl. 340—15)

This invention relates to the study of transient waves recorded in phonographically reproducible form and more particularly to a system for producing a visual display and secondary recordings of seismic data to facilitate study of records such as are produced in seismic exploration for the location of structures possibly capable of or likely to contain accumulations of petroleum.

This application is a continuation of applicants' copending applications Serial No. 244,386 filed August 30, 1951 for Seismic Record Display System and Serial No. 297,804 filed July 9, 1952 for Re-Recording of Seismic Records, both now abandoned.

It is customary to detonate an explosive charge near the surface of the earth at a sending station for the generation of seismic waves which travel from the point of generation to subsurface reflecting interfaces where a portion of the energy is reflected back to the earth's surface. Electrical signals generated in response to resulting earth vibration at a plurality of points spaced along the earth's surface from the sending station are preferably recorded such that the vertically traveling energy reflected from subsurface beds appears in bold relief on the resulting seismic record.

In many areas reflected energy often does not appear as distinctly as in areas where both surface and subsurface conditions are more nearly ideal for seismic exploration. Consequently, seismic efforts are often fruitless.

In order successfully to seismically explore such areas it has been proposed to record earth vibrations in the period immediately following detonation of the explosive charge undistorted and in phonographically reproducible form. With such a record 10, Fig. 1, there may then be performed various operations such as filtering, phasing and/or mixing of the signals as they are reproduced or played back in order to produce secondary records such as record 10a. A plurality of secondary records may thus be made from a single primary record to present data relating to the subsurface lithology more clearly than ordinarily is possible using the conventional techniques.

In accordance with the present invention there is provided a system for studying a primary seismic record 10 of transient waves 11 having associated therewith a periodic time base signal 12 and initial marker 13 in predetermined time-relation to the instant of generation of the transient. The system includes means 14 for cyclically scanning the record 10 repeatedly to produce on a scaled time base a first signal corresponding to the transient wave, a second signal corresponding to the periodic time base signal and a third signal coincident and corresponding with the initial time marker. A monitoring unit 15 having a signal channel 16 and a control channel 17 is connected to the scanning means for application of the transient to the monitoring unit signal channel. A normally non-conductive unit 18, connected to the scanning means, is responsive only to the second signal. A circuit 19 responsive to the third or the initial marker signal is connected between the scanning means and the non-conductive circuit to render it conductive during each cycle of the transient or first signal at a time coincident with the timing marker. A counter or pulse selecting circuit 20 is connected between the normally non-conductive unit and the control channel of the monitoring means to apply to the control channel a selected cycle of the second signal to actuate the monitoring means and render it responsive to the first signal. Means 21 operable in the interval following the selected cycle of the second signal and the beginning of the next succeeding cycle of the first signal renders non-conductive the unit responsive to the second signal.

In accordance with a further aspect of the invention there is provided automatic reset means for a ring counter or pulse divider system. More particularly, in a ring counter system characterized by a plurality of gas tubes each having a firing terminal connected to an adjacent tube to form a closed loop in which conduction of current from a voltage source is shifted sequentially from tube to tube around the loop, there is provided a resistance means in the circuit between the voltage source and the anodes of the ring counting tubes together with a high current normally non-conductive thyratron which is connected in parallel with the tubes. The thyratron is connected at its cathode to the negative terminal of the voltage source and at its anode to the anodes of the ring counter tubes. A condenser connected between the anodes of the ring counter tubes and the negative terminal of the voltage source accumulates a charge proportional to the voltage of the source. A reset pulse is applied to the grid of the thyratron to initiate conduction for discharge of the condenser in a period depending upon the time constant of the condenser-thyratron circuit whereby the voltage on the anodes of the ring counter tubes is lowered during such period beyond the point that conduction may be maintained. A circuit responsive to changes in the voltage at the anode of the thyratron is connected directly to the firing terminal of a selected one of the ring counter tubes for transmission of a pulse produced in time-coincidence with the application of the reset pulse to the thyratron. Means in the latter circuit are provided for delaying transmission of the pulse a time interval greater than the period of discharge of the condenser to initiate conduction after such discharge and after recovery of the thyratron.

In accordance with a further aspect of the invention, there is provided a system for synchronizing with the reproduction of signals on the primary record the re-recording thereof after selective treatment on a space scale related to the time-occurrence of the original event independently of the speed characteristics of the reproducing and/or recording elements.

In accordance with a more specific aspect of the invention a system for re-recording a phonographically reproducible record of seismic waves together with an initial marker recorded coincident with the generation of said seismic waves and with a time base signal is provided which includes signal producing means responsive to the record having three output signals corresponding to the record of said seismic waves, said time base signal and said timing marker. A transmission channel is provided for the first of the three output signals to apply the first output signal to a recorder having a recording medium driven past a recording point thereby to impress the first of the signals on the recording medium. A normally non-conductive channel is provided for the second of the three output signals, and a circuit responsive to the third of the three output signals is connected to the normally non-conductive channel to render it conductive coincident with the occurrence of the third output signal. The normally non-conductive channel is connected to the recorder to apply to the recording medium following the third signal the second of the output signals in a space relation with respect to the first of the signals the same as the time base on the original recording as related to the seismic signals.

In accordance with another aspect of the invention a space scale is produced on a recording medium as it is driven past a recording point by means of a pair of transducers positioned adjacent the recording point. Control pulses uniformly repeated in time are applied first to one and then to the other of the transducers to impress low intensity indications on the recording medium at points of a first spacing. Pulse dividing means responsive to the control pulses produces output pulses at a selected submultiple of the frequency of the control pulses, and the latter are applied simultaneously to both of said transducers to impress relatively high intensity indications at points on said medium of a second spacing related to the first spacing the same as the submultiple is related to the frequency of the control pulses distinctively to mark the scale.

For a more complete understanding of the present invention and for further objects and advantages thereof, reference may now be had to the following description taken in conjunction with the accompanying drawings in which:

Fig. 3 is a continuation of the circuit of Fig. 2;

Fig. 4 is a diagram of the two stages of the timing ring of Fig. 3;

Fig. 6 illustrates signal reproducing means and a portion of a timing control network;

Fig. 7 includes elements of the timing control network and the re-recording and display means; and Fig. 8 is a detailed schematic diagram of the timing marker producing means.

Figure 1:
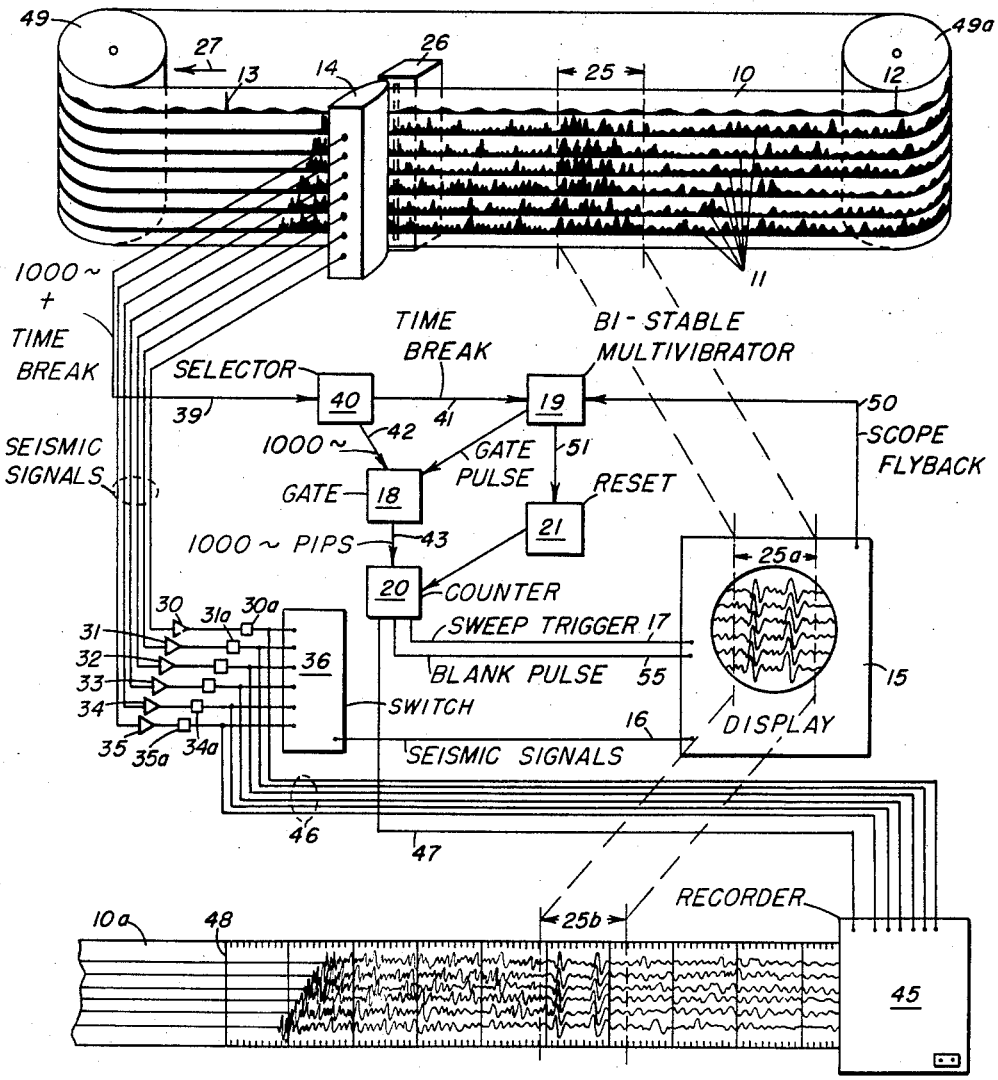
Fig. 1 illustrates a seismic display system, portions of which are in block diagram form.

Referring now to Fig. 1, the "six trace seismogram" is shown in the form of a variable area recording on a transparency such as a photographic record film 10. The six transient or signal traces 11 vary in amplitude in accordance with seismic signals received at a corresponding number of receiving stations spaced along a line on the surface of the earth in accordance with conventional seismic practices.

A variable area recording has been adopted for the purpose of this description since the functions to be considered may be graphically portrayed more readily than other forms of recording. It will be apparent that other types of phonograpically reproducible records may be utilized in practicing the invention. For example the variations in amplitude on the film 10 may be taken to represent intensity of magnetization of a magnetic tape or the modulation of a carrier for recording on a magnetic tape. Phonographic discs, or variable density records as illustrated in Patent No. 2,051,153 to Rieber, may also be found suitable. The term "phonographically reproducible" is therefore given in this case the same generic meaning as in the said Rieber patent.

Since the general procedure for obtaining seismic records is well known and understood by those skilled in the art, it will not be described here in detail. Briefly, however, at a sending station spaced from the receiving stations, an explosive charge is detonated to produce seismic waves, an electrical impulse being generated coincident with the detonation of the explosive charge. The latter impulse is recorded as the time break pulse or the initial marker 13 along with the timing signal 12 on the seventh record trace (the top trace, Fig. 1). The time break pulse 13 and the periodic timing signal 12 are utilized accurately to measure the time required for energy to travel from the aforementioned sending station to a subsurface reflecting bed and back to the receiving stations. While a relatively high frequency periodic timing signal, i.e. a carefully controlled 1,000 cycle per second signal, ordinarily is used, a low frequency sine wave signal has been here adopted and shown in Fig. 1 for the purpose of illustration only, it being representative of the conventionally employed high frequency signal.

The seismic data recorded on the six traces 11 is characterized by initially high energy levels corresponding with the arrival of refracted waves successively at each receiving station and thereafter followed by a relatively quiescent period. In the record interval 25 it will be noted that there is a prominent burst of energy, this energy appearing at an intermediate record time in such a manner as to be generally indicative of energy reflected from a subsurface bed. That all of the receiving stations are affected by a given burst of energy at approximately the same instant after detonation of the explosive is apparent from a mere inspection of the record. However, the reduction of such information to accurate data useful in calculating the depth of the causal reflecting interface is often an impossible task. This is particularly true when the seismic energy represented by variations in trace amplitude is singular in character from trace to trace. Seismologists in their interpretation of seismic records relay upon coincidence not only of the time-occurrence of record energy but also upon substantial coincidence in the character of the seismic energy at the several seismic detecting stations. The system illustrated in Fig. 1, as will hereinafter appear, is particularly useful in reducing to useful data the seismic information from a record that otherwise may not be utilized in determining the location and/or nature of subsurface beds.

By the present invention there is provided a system in which any selected record interval such as interval 25 may be displayed for detailed study and wherein the seismic energy occurring in that interval may be modified for deriving therefrom a maximum of intelligence.

While the details of the operation of this system will be explained in connection with Figs. 2 and 3, a more general description will first be given in connection with Fig. 1.

As illustrated in Fig. 1, varying voltages are produced which correspond both in number and in form to the signal traces 11 on the record 10. For example, they may be produced by light-sensitive devices housed in the unit 14 onto which a beam of light from a source 26 is projected. Unit 14 may include a plurality of transducers such as photo-electric cells. The light beam passes through a slit in the housing of source 26 and through the record 10 as its travels at substantially constant velocity past unit 14 in the direction of the arrow 27.

It will be apparent that, although the actual time interval in which the events on the seismic record occurred during the original recording thereof is fixed, the study of the resulting seismic record may be performed at rates slower or faster, depending upon the apparatus used and not in any way limited to the actual record interval. This, of course, will depend upon the velocity of the record 10 as it travels past the detector 14. Thus in the following discussion reference will be made to a scaled time base and a scaled time interval in which an appropriate scaling factor relates frequencies and time to actual physical conditions characteristic of the original seismic event.

The signals from unit 14 are applied on a scaled time base to the monitoring unit 15, a cathode ray oscilloscope for example, through seismic signal channels and a multi-circuit switch 36. The seismic signal channels preferably will include amplifying means 30–35 and filters 30a–35a selectively to pass desired components of the signals from the detector 14 as will hereinafter be explained in more detail.

As is understood by those skilled in the art, an electronic switch 36 receives a plurality of signals (i.e. from filter 30a–35a) and sequentially transmits the signals to the single input channel 16 of the oscilloscope 15 for presentation on the oscilloscope screen of the seismic signals either in the same form as they appear on the record 10 or selectively modified. It will be apparent that a multi-gun oscilloscope or monitoring unit may be utilized thereby eliminating the necessity of the electronic switch.

An electrical pulse generated in time coincidence with the detonation of the explosive charge is recorded and appears as the sharp opaque marker 13 superimposed upon the constant frequency time base signal 12. The output of the transducer in detector 14 responsive to the top record trace comprises two components. The first component is a constant frequency periodic signal which, regardless of the speed at which the record 10 is driven, provides a scaled time base voltage for measurement of the time occurrence on the record 10 of any selected seismic event. The second component is a sharp pulse or initial marker of distinctive character. It is generated once for each complete cycle of the record 10, at a scaled record time corresponding with the instant of detonation of the explosive charge. The scaled time base signal is produced by variations in light passing through the constant frequency portion 12 of record 10 whereas the initial marker is generated by variations in light due to the opaque marker 13 adjacent the detector 14.

Voltages including the distinctive initial marker and the time base voltage are applied to channel 39 leading from detector 14 and are applied to a selector or separator 40 which has a single input channel, channel 39, and two output channels, channels 41 and 42. The first output channel 41 selectively transmits the initial marker corresponding with the recorded pulse 13 to the circuit 19, a switching unit. Similarly, the channel 42 selectively transmits the periodic time base voltage corresponding to the periodic wave 12 to the gating unit 18.

As above mentioned, the periodic timing base signal 12 may be of any selected carefully controlled frequency. To expedite calculations in the decimal system a frequency that is a multiple of 10 is preferred. For the purpose of the present discussion, it will be assumed that the periodic wave 12 has a frequency of 1,000 cycles per second so that the channel 42 transmits a scaled 1,000 cycle per second signal to the gating unit 18.

The switching unit 19 may be a bi-stable multivibrator for example which operates selectively to render the gating unit 18 conductive or non-conductive in response to the initial marker pulse 13 thereby to control the intervals during which the periodic time base signal may be transmitted to the gating unit output channel 43.

When the gating unit 18 is conductive, it serves not only to transmit periodic timing pulses to the channel 43 but also to shape them for application to and actuation of the counting circuit 20. The periodic time base signal is applied to the counter 20 by channel 43 and is in the form of 1,000 unidirectional pulses per scaled second interval whereas the voltage on the output channel 17 of counter 20 is a single pulse for actuation of the oscilloscope 15

Counter 20 is essentially a selective time delay network which selects from the periodic time base signal any selected pulse following the instant that the gating unit 18 is rendered conductive. It operates as a count down circuit operative to produce pulse division by a selectable whole number ratio. The application of a single selected pulse to the oscilloscope 15 in each cycle of reproduction of the seismic record 10 triggers the sweep voltage generator of the oscilloscope 15 to initiate, for each cycle of the record 10, the presentation of a visual display on the screen of the oscilloscope 15. The seismic events will thereby appear at precisely the same location on the oscilloscope screen for each cycle of record 10. Thus the record 10 may be repeatedly driven past the detector 14 and the selected portion of the record such as the portion 25 may be repeatedly displayed on the oscilloscope screen as portion 25a in such detail that the filtering means 30a–35a associated with amplifiers 30–35 may be adjusted for optimum resolution of the seismic data. When such resolution has been accomplished, the permanent record 10a may be made of the seismic signal, thus modified, upon energization of the recorder 45 which may be of the conventional type and which records the plurality of traces as undulating lines. More particularly, the modified seismic signals as they appear at the outputs of the amplifying channels are applied by way of the plurality of circuits 46 to the input terminals of the recorder 45.

As will hereinafter be explained, a time scale channel 47 interconnects the counter 20 and the recorder 45 to provide a time controlled scale on the secondary record 10a. It will be shown that in accordance with a preferred mode of operation the first timing line 48 on record 10a appears in a space relation relative to the record segment 25b, in the same relation as the initial marker 13 bears to the interval 25 of record 10. The space relation between line 13 and segment 25 may be same as between timing line 48 and record segment 25b or they may be different depending upon the scaling factor inherent in the reproduction and re-recording of the signals on record 10.

As above noted, the record 10 in the form of a continuous loop, carried by rollers 49 and 49a, is driven at a constant speed by means such as a suitable motor (not shown). The record follows a path closely adjacent the detector unit 14 repeatedly to reproduce the seismic signals in the form of varying voltages. Following each cycle of signal generation from detector 14, the gate 18 and counter 20 are reset preparatory to receiving the next succeeding cycle.

A voltage directly related in time to the signal presentation on the oscilloscope 15, such as the voltage applied to the horizontal oscilloscope plates, for example, is applied by way of channel 50 to the bi-stable multivibrator 19 to actuate the latter and render gate 18 non-conductive. Additionally, a pulse is applied by way of channel 51 and the reset generating circuit 21 to the counter 20. The reset generating circuit 21 operates to place the counter 20 in a zero or initial condition for reception of a succeeding cycle of signals from the detector 14.

Additionally, a beam control voltage is applied by way of channel 55 to the oscilloscope 15, as a beam blanking voltage pulse to suppress the cathode stream and thereby produce a distinctive marker at a known time after display interval 25a of the seismic signals in the record interval 25.

Now that a general description of operation of the system of Fig. 1 has been given, the following more detailed description of the various elements that comprise the system and the cooperation between the elements will now be helpful in understanding the invention.

The system for producing the signals from the variable area record 10 may, for example, take the form generically illustrated in the Patent 2,493,519 to Baltosser or the Patent 2,463,534 to Hawkins. Other reproducers for use with different recording mediums similarly are available in the art and will be found to be suitable.

The amplifying channels 30–35 may be conventional seismic amplifiers with adjustable filtering means therein. A preferred amplifying system is illustrated in the application Serial No. 214,553, now U.S. Patent 2,725,534, issued November 29, 1955, of William B. Hemphill, a co-worker of applicants', for Recording Seismic Waves Without Phase Distortion. Other systems known in the art may be adequate in the treatment and modification of the seismic signals for the production of secondary seismic records.

The multi-circuit switch 36 has not been illustrated in detail but may comprise a ring of freely running monostable multivibrators, each element of the ring actuating a gating tube for cyclically and sequentially applying the six seismic signals from channels 30–35 to the single input of the oscilloscope 15. Such electronic switching systems are well known in the art, and consequently it is not deemed necessary to describe in detail such a circuit. Alternatively, and as above noted, a multi-gun oscilloscope may be used without the need for the multi-circuit switch 36.

Figure 2:
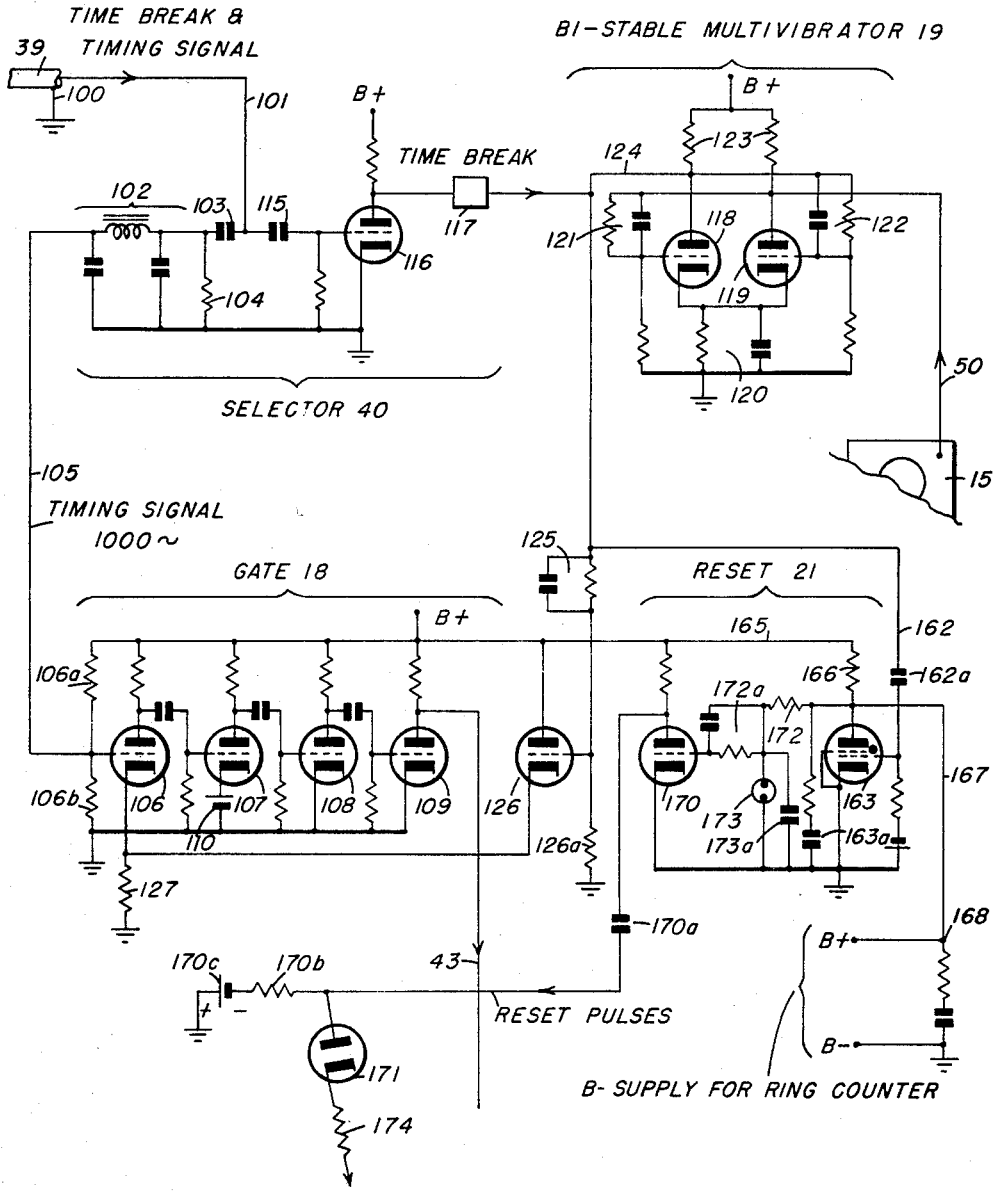
Fig. 2 is a more detailed schematic diagram of a portion of the system of Fig. 1.

Figs. 2 and 3 illustrate in detail the system for interconnecting the elements above briefly discussed for presentation of the display on the oscilloscope 15 in response to and under control of the time break signal 13 and the time base signal 12. Figs. 2 and 3 are parts of the same circuit and should be considered together. Conductors interconnecting the two figures are similarly labeled in both figures.

Referring first to Fig. 2, one of two conductors forming channel 39 is connected to a ground terminal 100. The other conductor is connected by way of the conductor 101 to the selector 40. A first circuit in the selector is responsive only to the time base signal and includes a filter 102 whose output is connected to the gate 18. More particularly, conductor 101 is connected by way of condenser 103 and filter terminating impedance 104 to the low-pass filter 102. The filter of conventional type may be an L–C circuit such as illustrated designed selectively to pass a 1,000 cycle signal, due consideration being given to the time scaling factor. The periodic wave 12, Fig. 1, appears on the output conductor 105 from the selector 40 and is applied to the gate 18.

The gate circuit 18 includes an input stage 106 followed by pulse shaping stages 107, 108 and 109. The pulse shaping stages are conventional resistance-capacitance coupled amplifiers. However, one stage, the stage 107, has negative biasing means in its cathode-grid circuit (a battery 110) for biasing the tube 107 to cut off so that only the positive half cycle of the signal applied to its grid is transmitted to tube 108. Such positive half-cycles are then amplified and differentiated in the R–C coupling impedances to produce at the anode of tube 109 positive voltage pips recurring at a rate of 1,000 per scaled second interval. The anode of tube 109 is coupled by way of conductor 43 to the input or control bus 140 of a first ring counter 20a (Fig. 3).

The initial marker signal is superimposed on the periodic time base signal in channel 39 and corresponds to the time break 13 (Fig. 1). A condenser 115 connected to the grid of a tube 116 passes both the time marker pulse and the time base signal. The anode of tube 116 is connected to a filter represented by block 117 which rejects the periodic time base signal and passes the time marker signal by way of conductor 124 to the grid of tube 119. The latter tube, together with a similar tube 118, comprises the bi-stable multivibrator 19. Tubes 118 and 119 have their cathodes coupled directly together and connected by way of R–C circuit 120 to ground. The anode of tube 119 is coupled by way of the R–C parallel circuit 121 to the grid of tube 118. Similarly, the anode of tube 118 is coupled by the R–C circuit 122 to the grid of tube 119. The anodes of tubes 118 and 119 are also connected by way of resistors 123 to the B+ terminal of a suitable source of direct current voltage.

The tube 119 normally is in a conducting state. When such is the case, the anode voltage of tube 119 is more negative than the anode of tube 118. The anode of tube 118 is coupled by way of conductor 124 and R–C circuit 125 to the grid of a triode 126 which forms a part of the gate circuit 18. The cathode of tube 126 is connected directly to the cathode of the gate circuit input tube 106. The cathode current then flows through the common cathode resistor 127.

In operation when tube 119 of the bi-stable multivibrator is conducting, the grid of tube 126 is at a relatively high positive potential and in such condition its cathode current flows through resistor 127. The tube 126 having a relatively high current carrying capacity and operating as a cathode follower may control the voltage across resistor 127. The cathode of tube 106 is thus maintained at a relatively high positive potential. The potential of the grid of tube 106 is adjusted to be at or beyond a cut-off point for tube 106 by selection of the resistors 106a and 106b. Resistors 106a and 106b are connected in series between B+ and ground. The common juncture therebetween is connected to conductor 105 and the grid of tube 106. Thus, when tube 119 is conducting, no current flows through tube 106.

However when the initial marker, a voltage pulse of negative polarity, is applied from filter 117 to the grid of tube 119, the current flow therethrough is stopped. Simultaneously, the feedback of the change of voltage at the anode of tube 119 through the network 121 to the grid of tube 118 causes tube 118 to begin to conduct. When tube 118 is conducting, its anode potential is driven to a voltage less positive than when in the non-conducting state. Due to feedback in circuit 122, tube 119 is maintained non-conductive. When tube 118 is conducting, the time base signal may pass through the gate 18.

Voltage pips produced in the gating unit 18 and applied by way of conductor 43 to the counter system 20 are utilized as illustrated in Fig. 3 to control the oscilloscope 15. The counting circuit 20 broadly is a device for applying a selected voltage pulse to the oscilloscope 15 selectively coincident with or at an instant a known interval after the initial marker. Such interval is an integral multiple of the occurrence of time-periods of the time base voltage.

In Fig. 3 there are four ring counters, 20a, 20b, 20c and 20d, with only a part of the first ring shown in detail. They are connected in series to permit four-digit control over the interval or "delay" between the initial marker and the application of a selected time base pulse to the oscilloscope 15. It will be remembered from the discussion of Fig. 1 that a selected voltage pulse is applied to the oscilloscope 15 to initiate or actuate the sweep generating voltage for presentation of a selected portion of the signals applied to its signal input terminals.

The ring counters 20a–20d are similar in construction, each being made up of a ring of ten switching tubes. In Fig. 4 there are illustrated the local circuits of two adjacent switching tubes. This circuit and its operation fundamentally is as illustrated and described in "Wave Forms," M.I.T. Radiation Laboratory Series, vol. 19, McGraw-Hill Book Company, Inc., 1949, particularly at page 612 and illustrated in Fig. 17.10. Quite briefly, tube 130 of Fig. 4 has its cathode connected by way of a resistor 131 to ground and to the negative terminal (B—) of a voltage source. The positive terminal (B+) of the voltage source is connected to the anode of tube 130. Tube 130 is a thyratron having a control grid and a shield. The shield grid is connected by way of a resistor 132 to the negative terminal of a source whose positive terminal is connected to ground, thus maintaining the shield at a high negative potential. Similarly, the shield of the succeeding tube 134 is connected to the negative terminal of source 133 by way of resistor 135. The control grid of tube 130 is connected to its cathode and the cathode is connected to the shield grid of tube 134 by way of a resistor 136. The cathodes of tubes 130 and 134 are interconnected by way of a condenser 137.

The shield grids of both tubes 130 and 134 are connected to a control bus 140 through signal transmitting elements (condensers 141). The time base pulses on conductor 43 are applied to the bus 140. Assuming that tubes 130 and 134 are adjacent tubes in a ring of (n) counters and that tube 130 is conducting, the next succeeding pulse applied to bus 140 and through condensers 141 fires tube 134 which raises the potential of the cathode thereof. This change in cathode potential coupled to the cathode of tube 130 raises the latter to a point more positive than the potential of its anode, thus extinguishing tube 130. The next succeeding pulse fires the tube following tube 134 and extinguishes tube 134 in a similar manner.

At the instant tube 134 begins to conduct and tube 130 is extinguished, there is an abrupt change in the D.C. level of the cathode voltage on both tubes. Such changes are utilized, as will hereinafter be explained, for the operation of successive ring counter stages. In Fig. 4 the cathodes of tubes 130 and 134 are connected to adjoining terminals of a multi-position selector switch 150 by way of conductors 142 and 142a, respectively.

Referring again to Fig. 3, it will be seen that tubes 130 and 134 form two stages of a "ring-of-ten" counter, their relationship being precisely the same as shown in Fig. 4. Only a portion of the ring counter, the portion including the tubes 130, 134 and the additional tubes 143, 144 and 146, is illustrated. It will be understood that the portion omitted is constructed after the order of the portion shown. The selector switch 150 is manually adjusted to conduct to an output circuit including resistor 151 and rectifier 151a the change in the cathode voltage of any selected stage of the ring-of-ten counter circuit.

The operation of the ring counter will perhaps best be understood by considering in detail one cycle of operation. Assume at the outset that tube 130 is conducting prior to the generation of the initial marker. At this instant it will be remembered that gate 18 is non-conducting so that there is no signal on the conductor 43.

Coincident with the generation of the initial marker, gate 18, Figs. 1 and 2, is rendered conductive and the time base signal, 1,000 cycle pulses, is applied through gate 18 to the input bus 140, Fig. 4. Each succeeding pulse of the 1,000 cycle time base signal initiates conduction in one tube of the ring counter and extinguishes the preceding tube. More particularly, the first pulse is effective to fire tube 134 and to extinguish tube 130. The second pulse of the 1,000 cycle signal is effective to fire tube 143 and extinguish tube 134. The third pulse of the 1,000 cycle signal similarly fires tube 144 and extinguishes tube 143. As long as the 1,000 cycle signal appears on the bus 140, the tubes in the ring counter 20a will fire sequentially, the firing order being tubes 130, 134, 143, 144 . . . 146 and 130, etc.

While the firing cycle is continuous at a rate dependent upon the 1,000 cycle signal, the output from the ring counter 20a is a sub-mutiple of the firing rate, and in a ring-of-ten counter the output will have 1/10 the frequency of the 1,000 cycle signal. For every cycle of operation of the ring counter 20a, a signal pulse then appears at the armature of the switch 150 for transmission through the resistor 151 and the rectifier 151a to a pulse shaping circuit 152 which, as indicated in Fig. 3, may be a monostable multivibrator (M). The output pulses from the ring counter 20a, shaped by the multi-vibrator 152, are then applied to the ring counter 20b, also a ring-of-ten counter, for further reduction in the output pulse rate. Thus it will be seen that from the 1,000 cycle signal applied to counter 20a, a 10 cycle signal will appear at the output of ring counter 20b. In a similar manner the 10 cycle pulses are applied to the ring counter 20c to produce 1 cycle pulses for application to the ring counter 20d which in turn produces 0.1 cycle pulses for application to the control circuit of the oscilloscope 15. By utilizing the foregoing count-down circuit, essentially a selective time delay circuit, the sweep voltage on oscilloscope 15 may be triggered or fired at anly instant following generation of the initial marker signal from time break 13 on the seismic record 10. The instant of application of a trigger pulse to the oscilloscope 15 must, of course, be located in time after generation of the initial marker an interval that is equal to an integral multiple of the timing periods of the 1,000 cycle time base signal. The interval may be one equal to or less than the period of the time base signal or may be many times the period.

Each of the ring counters has an output selector switch such as switch 150 shown in the counter 20a. If it is desired to view on the oscilloscope 15 the portion 25 of the record 10, assumed for the present purpose to appear on the seismic recording during the interval of from 0.5 to 0.6 second, the selector switches may be set to initiate display at 0.45 second by adjusting the switches in the following manner. Switch 150 of ring counter 20a will be set on position 0; 20b on position 5; 20c on position 4; and 20d on position 0.

In order to produce repeated and cyclic presentation of the desired record segment 25, the ring counters 20a–20d must be reset following each cycle of scanning of the record and the gate 18 must be closed in order to set up the next cycle of operation. This function is accomplished by utilizing a voltage pulse from the oscilloscope 15, preferably a pulse derived from the sweep voltage on the horizontal oscilloscope plates. The sweep voltage conventionally is triangular in form, linearly increasing as a function of time for each presentation and then instantly dropping to a low initial value at the end of each presentation. The oscilloscope beam then "flies back" to its initial position. The sweep voltage, differentiated, is a single pulse positioned in time at the end of the presentation. A simple differentiating circuit (not shown) may be utilized to produce a voltage pulse on conductor 50, Fig. 3, which appears in Fig. 2 as applied through circuit 121 to the grid of the tube 118 of mutivibrator 19.

The voltage pulse on conductor 50 being highly negative when applied to the grid of tube 118 extinguishes tube 118 and at the same time, because of the connection through circuit 122 to the grid of tube 119, initiates conduction therein.

The abrupt change in the voltage level on the anode of tube 118, as above explained, renders the gate 18 non-conductive. Additionally, another function is performed, the change in anode voltage of tube 118 is applied by way of conductors 124 and 162 and condenser 162a to the grid of tube 163. Tube 163 is the input tube of the reset circuit 21. Tube 163 has its cathode connected directly to ground and is connected to conductor 165 by way of load resistor 166. The conductor 165 electrically is common to the anode circuit of the reset circuit 21 and also the anode circuits in the gate 18. Conductor 165 also is connected to a B+ terminal of a suitable D.C. source to supply plate voltage to the foregoing tubes.

The anode of tube 163 is connected through resistor 172 and the RC parallel circuit 172a to the grid of a tube 170. The point intermediate resistor 172 and the resistor-condenser circuit 172a is connected to ground through a neon tube 173. A condenser 173a is connected in parallel to the tube 173. The cathode of tube 170 is connected to ground and its anode is connected through a load resistor to the conductor 165. Additionally, the anode is connected by way of condenser 170a to the anode of diode 171. The diode 171 is also connected by way of resistor 170b to the negative terminal of a D.C. source 170c.

Preferably, tube 163 is a gas filled thyratron, a high current type, having a low plate voltage drop when in the conducting state. Application to the grid of tube 163 of the voltage change at the anode of tube 118 fires tube 163. The condenser 163a, connected through a series resistor to the anode of tube 163 and initially charged to the potential on the anode of tube 163, discharges through the tube 163. The conduction period of the tube 163 is determined by the time constant of the circuit comprising condenser 163a the series resistor and tube 163. At the end of this period the voltage on the anode of tube 163 is not sufficient to maintain conduction. Thus tube 163 is extinguished shortly after it is fired. As the condenser 163a recharges, the voltage at point 168 rises to the potential on conductor 165. During conduction by tube 163, the voltage at point 168 is at a low level (a conduction voltage of approximately 8 volts). Since point 168 is the B+ terminal for all of the tubes in the ring counters 20a–20d, the tubes of the ring counters are all extinguished.

Not only must all of the tubes in the ring counters 20a–20d be extinguished at the end of each cycle of display on the cathode ray oscilloscope 15, but also a selected initial tube must be fired preparatory to a succeeding cycle of signals from the seismic record so that a given portion of the seismic record may be made to appear at precisely the same position on the face of the oscilloscope tube for each display cycle. To this end, the change in voltage of anode of tube 163 is applied, after a suitable time delay in the circuit 172a, to the tube 170. The resultant change in anode voltage of tube 170 is coupled by way of condenser 170a, rectifier 171 and the resistor 174 to the shield grid of the tube 130 in the ring counter 20a. It will be remembered that the action of tube 163 extinguished all of the tubes in the ring counters. Therefore application of the single pulse to the shield grid of tube 130 will initiate conduction therein. A similar connection is provided to apply a similar conditioning pulse to a corresponding tube in each of the ring counters 20b, 20c and 20d so that in each ring counter the tube having its cathode connected to the zero position of its associated output selector switch will be conducting prior to the generation of an initial marker signal for each succeeding cycle of the record 10.

It is to be noted that as the tubes in the ring counters 20a–20d fire in succession, there is produced a series of pulses appearing between point 168, Fig. 2, and ground due to the switching from one tube to another. If such pulses were allowed to drive the grid of tube 170, resulting in their application through the reset circuit 171, 174, the otherwise orderly and cyclic operation of the ring counters would be disrupted. To prevent such unwanted application of pulses to the reset circuit, the neon tube 173 and its parallel condenser 173a are provided. The neon tube 173 has a voltage characteristic such that above a certain voltage it readily conducts and below that voltage it acts as an infinite impedance. When tube 163 is non-conducting, the voltage on conductor 165 is applied to the neon tube by way of resistors 166 and 172. Thus during the period that the ring counters are running, the unwanted pulses appearing at point 168 are effectively shunted to ground through the conducting neon tube 173 and therefore are not effective on the grid of tube 170 particularly since the resistor 172 has a high value compared to the resistance of the tube 173 when conducting. The resistor 172 and tube 173 form a voltage sensitive divider, producing voltage division in dependence upon the state of operation of tube 163. When tube 163 fires, the voltage across the neon tube 173 is lowered to such a relatively low value that it will not conduct. Tube 173 is then a high impedance and the reset pulse may then be applied to the tube 170.

It will be remembered that the reset pulse itself initiates conduction in tube 163. If, at precisely the same time, the reset pulse passes to the tube 170, it will appear in the ring counters when the anode voltages are low. The tubes in the ring counters are not, at that instant, capable of conduction. By providing the combination of the resistor-condenser circuit 172a and the condenser 173a there is produced a time delay between the instant that the reset pulse fires tube 163 and the instant that the reset pulse appears on the grid of tube 170. This time delay is equal to and preferably slightly greater than the recovery time of the tube 163. The latter recovery time is determined by the time constant of the circuit which comprises condenser 163a and its series resistor.

The sequence of operations in the above described system is as follows:

(1) The initial marker renders gate 18 conductive;

(2) The time base signal, the 1,000 cycle signal, is shaped and passed through gate 18 to actuate the ring counters;

(3) The seismic signals representing the traces 11 of Fig. 1 are applied to the signal input circuit of the oscilloscope 15;

(4) At an instant dependent upon the setting of the switches in the ring counters, the sweep voltage on the oscilloscope 15 is triggered initiating display of a selected portion of the seismic record;

(5) At the end of the display period, a pulse is applied to the multivibrator 19 which immediately renders gate 18 non-conductive;

(6) Simultaneously tube 163 is fired dropping the anode voltage on all of the tubes of the ring counters thereby extinguishing all of the ring counter tubes;

(7) Tube 163 becomes non-conductive following discharge of condenser 163a;

(8) The reset pulse, delayed in circuit 172a, is applied after recovery of tube 163 to the shield grid of the zero tube in each of the ring counters 20a–20d placing the counters in condition for reception of the next succeeding cycle of the record 10.

Stated otherwise, the means are provided for studying a phonographically reproducible seismogram on which seismic signals and timing signals are recorded and includes a control system along with the means for cyclically producing electrical signals which correspond with the seismic signals and for concurrently reproducing the timing signal. The control system includes an electron beam display system with means for deflecting the beam in one sense in concurrence with variations in the electrical signals together with means for initiating the deflection of the beam in a second sense under the control of the timing signal to display a desired fraction of the seismogram. A selectively adjustable control is then provided for controlling the instant of initiation of deflection in the second sense relative to the instant of initiation of the seismic signals.

Referring again to Fig. 1, the channel 55 is connected between the counter 20 and the monitoring means 15 for applying to the monitoring means a blanking pulse. While the specific electrical connections have not been illustrated in the more detailed Figs. 2 and 3, it will be understood that the blanking pulse or pulses may be applied momentarily to stop or shut off the cathode ray at a selected time with respect to the initial marker 13 on the record 10. It has been found to be preferable to blank the cathode beam for an instant at scaled record intervals of 0.1 second thereby to provide an accurate measurement of the time occurrence of a specific event on the seismic record as it appears on the screen of the oscilloscope. If desired, a second set of ring counters identical in construction with counters 20a–20d may be utilized to apply a blanking pulse to the cathode ray beam at any time after the time break equal to an integral multiple of the period of the time base signal. With such a system, not only will the display of the seismic record be initiated at a selected instant, but also the time occurrence of any event on the displayed portion of the record will be accurately indicated by the settings of four selector switches associated with the ring counters of the blanking pulse producing system.

Alternatively, the channel 55 of Fig. 1 may receive a pulse directly from the 1 cycle counter 20d to blank the cathode beam each 0.1 scaled second interval after initiation of the display. By this means the time-occurrence of any event on the record may be measured without the need for additional ring counters. The term "blanking pulse" connotates complete momentary suppression of the cathode beam. It will be appreciated that a beam intensifying pulse may also be used as a display marker.

In accordance with another mode of operation in which a blanking pulse for accurate timing measurement on the displayed portion of the record is not desired, the sweep trigger, as noted in Fig. 3, may also be applied to the anode of the tube 118, Fig. 2, to reset the counting system at the beginning of the display rather than at the end of the display.

From the foregoing it will now be apparent that a selected segment of record 10, Fig. 1, such as segment 25, may be repeatedly presented or displayed as segment 25a on oscilloscope 15. For each cycle of reproduction and display the segment will appear on the oscilloscope in the same position. This provides a tool whereby an operator may observe the character of the seismic signals on oscilloscope 15 while modifying by means of suitable filters 30a-35a the amplitude-frequency characteristics of the seismic signal channels thereby to produce an optimum selectivity in so far as a particular record segment is concerned. The otherwise unintelligible portion 25 of record 10, when properly treated, may yield signals highly definitive of reflected energy from subsurface beds. Signals of such character may then be permanently captured or impressed on the record 10a.

It will be apparent that flexibility of the system in selecting the instant of initiation of the display and the period of the sweep voltage on the oscilloscope 15 makes the system particularly useful. By use of a fast sweep, any selected limited portion of the record 10 may be presented in a highly magnified manner for detailed analysis of such segment. If a much slower sweep is utilized, an entire seismogram may be presented on the face of the oscilloscope. In practice it has been found preferable to utilize a sweep on the oscilloscope 15 such as will produce seismic signal displays of dimensions generally corresponding with those found on the conventional seismic records such as record 10a.

Having described in detail the system for display of an entire recorded transient phenomena on the record 10 or a portion thereof, there will now be described a system for producing secondary seismic records such as record 10a, Fig. 1, particularly where such secondary records are provided with a time scale which may be relied upon as an accurate measure of the original time occurence of reflected energy appearing on the secondary record.

Figure 5:
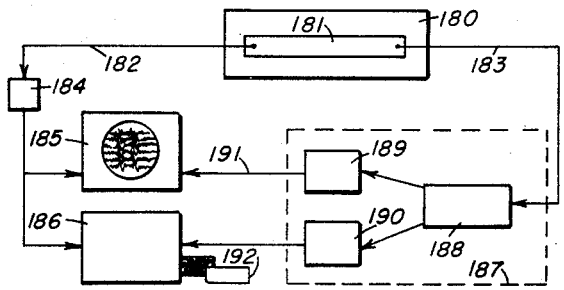
Fig. 5 is a simplified block diagram of a display-re-recording system.

Referring to Fig. 5, a block diagram, the system is illustrated as including a reproducer 180 having a translating means 181 which has two output channels 182 and 183. The seismic signals are transmitted by way of channel 182 and selective network 184 to both a visual display means 185 and to a re-recorder 186. The initial marker and the time base signal are transmitted by way of channel 183 to a control unit 187 which includes three basic elements. A first unit 188 is adapted to control the performance of two subsidiary units 189 and 190. Unit 189 selects one of the pulses from the time base signal for transmission by way of channel 191 to unit 185. Such pulse is for the purpose of initiating the display on unit 185. Unit 190 is adapted to translate a series of electrical pulses from the time base signal, beginning with the initial marker for producing for the re-recorder 186 a timing scale on a secondary record 192.

The system displayed in the block diagram of Fig. 5 is found in detail in Figs. 6, 7 and 8. In considering the latter figures, it should be kept in mind that Figs. 6 and 7, appearing on separate sheets of drawings, are to be taken together as they are parts of a common system for producing a secondary record. Appropriate interconnecting conductors have been provided and suitably identified to make clear the relationship between the two figures. Fig. 8 forms one element of the system of Figs. 6 and 7.

Referring to Figs. 6 and 7, seismic signals corresponding with traces 11 of Fig. 1 are here recorded on a loop of magnetic tape 210 having a plurality of traces in a side-by-side relationship. Tape 210 is mounted on rollers 211 and 212 which are driven from an external source (not shown) repeatedly and cyclically to drive the record past translating device 213, a multi-head magnetic detector or reproducer. For the purpose of the present description, the detector 213 will be assumed to have seven channels, six of which are connected by way of cable 214 to amplifiers 215-220. Amplifiers 215-220 may be of the type well known in the art, each having independently selective frequency characteristic controls to produce output signals for application to a recorder 221 as in Fig. 1. A monitoring oscilloscope 222 functionally the same as unit 15, Fig. 1, is also connected to the output of amplifiers 215-220 and suitably actuated, as above described, repeatedly to present in controlled graphic array the wave forms of the signals appearing at the output of the amplifiers.

The recorder 221 preferably is of the type utilizing photo-sensitive paper and includes a plurality of moving coil galvanometers for producing variable amplitude traces on the record 10a which correspond with the modified signal outputs of amplifiers 215-220. The galvanometers have not been illustrated since they are well known in the art. By way of example, they may be of the type generically disclosed in "Exploration Geophysics," Jakosky, Times-Mirror Press, 1940, page 590 et seq.

If the record produced by recorder 221 is to be useful in determining the relationship of subsurface reflecting interfaces to the earth's surface, a suitable time scale must be provided on the newly produced record. The magnetic record 210 includes not only the above-mentioned six channels of seismic signals but in addition thereto a seventh channel having an initial marker and a constant frequency timing base such as graphically portrayed on record 10, Fig. 1. As on record 10, the initial marker and constant frequency timing base, for example a 1,000 cycle per second signal, are impressed upon the same track on the magnetic record 210 and are thus reproduced in a common circuit. The initial marker and timing base signal appear combined on the channel 225 although it is obvious that separate channels could be used.

Thus there are three distinct output signals produced by translating device 213. The first output signal corresponds with the recorded seismic signals. The second output signal corresponds with the constant frequency time base. The third output signal is derived from and corresponds with the initial marker pulse. The present invention contemplates that the initial marker and the time base signal will be utilized to actuate the recorder 221 in such a manner as to produce on the new seismic record 10a an initial marker and a time base that appear in the same time relation with respect to the modified signals from amplifiers 215-220 as the original timing marker and the original time base are related to the original seismic event.

The rate at which the magnetic tape 210 is driven during the original recording, in general, will not be the same as the rate at which it is played back unless great care is taken both during recording and playback. In general, variables are introduced such as by changes in length of the magnetic recording medium under different temperatures and driving tensions that may not possibly be duplicated upon reproduction of the seismic signals from the magnetic record. By the present invention, applicants provide a system for re-recording seismic information in a reliable time relationship substantially independent of mechanical variations introduced by the initial recording system and the reproducing system, thus obviating the necessity for complicated speed control means for the driving mechanisms both in the field recording system and in the playback system.

The seismic signals reproduced from the record 210 stand in a scaled time relation with respect to the original seismic event. The desirability of the present invention will be appreciated when it is recognized that the scaling factor between the original event and the reproduced signals does not ordinarily remain constant. The scaling factor may be varied over several octaves intentionally for filtering purposes as in Patent 2,594,767 to Robert P. Green, or it may vary unavoidably in a much more limited manner even though great care is taken to synchronize movement of the magnetic record 210 and the recording medium comprising the record 10a. Variations of the latter nature are insidious, but in either case introduce serious difficulty for an operator or seismic interpreter has no means for detecting the latter or for correcting accurately for either type variation. For example, dimensional variations in the magnetic record 10 in the interval between its initial recording and playback may be such as to introduce appreciable errors in the production of the secondary record 10a even though synchronization of the two records is carefully controlled.

It should be remembered that the ultimate use of the secondary record 10a is to determine variations in the depth of reflecting horizons or alternatively to determine variations in the time required for an acoustic signal to travel from the surface to such horizons and return. With the velocities of sound ranging from 2,000 to 20,000 feet per second in earth formations, it is apparent that an error in record time in the order of one-thousandth of a second should be considered serious. Even with careful synchronization, errors of the magnitude of one part in a thousand may readily be introduced. If the record 210 and the secondary record 10a are not synchronized, variations in the speed of the playback system and of the re-recording system will introduce errors of appreciable magnitude. During the production of a single record such as record 10a, there may be appreciable variations in the scaling factor which relates the time occurrence of the original seismic event to the waves on a space scale on the record 10a.

By the present invention a time scale is provided for the recorder 221 which is reliably related by a scaling factor to the original seismic event such that the time scale varies in exactly the same manner as does the scaling factor. Therefore the variations in the scaling factor are compensated for. The secondary records are then wholly independent of variables introduced by the physical recording and reproducing system.

In references hereinafter made to the timing base and the initial marker, it will be understood that for the purpose of illustration the timing base preferably is a recording of a constant frequency signal, as above assumed to be 1,000 cycles per second on the original recording. The timing marker preferably is a recording of a voltage pulse or other control means corresponding in time with the instant of generation of the original seismic waves.

Referring again to Fig. 6, the timing base appears on conductor 225 and is isolated from the initial marker by circuit 227 tuned to 1,000 cycles per second for application to the input of a gate network 228. As above described, the time base is transmitted successively through tubes 229, 230, 231 and 232. In passing through the channel including tubes 229–232, the time base is clipped and differentiated, producing both a positive and a negative voltage spike each cycle. By operation of the tube 231 with the battery 231a connected in its grid-cathode circuit, the negative peaks are removed so that at the anode of tube 232, and thus at the output terminal 233, positively polarized unidirectional pulses appear recurring at the rate of 1,000 per scaled second.

An additional tube 235 in gate 228 is normally conductive. The cathode circuit of tube 235 includes a resistor 236 which is common to the cathode circuit of tube 229. When tube 235 is conducting, the voltage developed by reason of current flow through resistor 236 is of such magnitude as to maintain tube 229 non-conductive. In operation, tube 235 is normally conductive and the signal channel of gate 228 normally is non-conductive but is rendered conductive coincident with production of the timing marker signal.

More particularly, tube 235 is controlled by a bi-stable multivibrator 240 which includes multivibrator tubes 241, 242. The anode of tube 241 is connected by way of conductor 243 and filter 244 to the grid of tube 235. Resistor 245 is connected between the grid of tube 235 and ground. In operation, tube 242 is normally in a conducting state. When such is the case, the anode voltage of tube 242 is more negative than the anode of tube 241. Thus the grid voltage on tube 235 is relatively positive, permitting current flow. When the multivibrator 240 is triggered, as by application of the initial marker through tube 246 to the grid of tube 242, current flow is abruptly terminated in tube 242 and simultaneously is initiated in tube 241. The initial marker is of amplitude greater than the 1,000 cycle timing base. Tube 246 is biased beyond cutoff by battery 247 so to prevent the 1,000 cycle signal from actuating the multivibrator 240 and to permit transmission to multivibrator 240 of the initial marker only. Current flow in tube 241 maintains tube 242 non-conductive thereafter and until a similar pulse is applied to the grid of tube 241.

When tube 241 is conducting, its anode is driven to a voltage less positive than when in the non-conducting state. This voltage, appearing as a voltage change on the grid of tube 235, stops conduction therein from an instant coinciding with generation of the initial marker in channel 225. When tube 235 ceases to conduct, the cathode bias voltage across the common cathode resistor 236 is lowered to permit conduction through tube 229, thus opening gate 228. The time base pulses then appear at the terminal 233.

The time base pulses at terminal 233 are applied in Fig. 7 to fire ring counter 251. Four ring counters, 251, 252, 253 and 254, connected in series provide a means for controlling transmission of a single pulse to terminal 255 to actuate the sweep circuit of the cathode ray oscilloscope 222 a predetermined time interval after gate 228 is opened as explained in detail in connection with Figs. 2–4. By suitably adjusting the controls on the ring counters 251–254, the display on oscilloscope 222 of the seismic signals appearing at the outputs of amplifiers 215–220 may be initiated at any desired instant following the initial marker. By manipulation of the oscilloscope controls and the ring counters, the seismic signals may be examined in minute detail or may be viewed in gross for adjustment of filters in amplifiers 215–220 to produce modified seismic signals that are of optimum character. Such signals may then be utilized to energize recorder 45.

In order to provide the scale for the record produced by recorder 45, the timing pulses appearing on the input busses 252b and 253b of ring counters 252 and 253, respectively, are applied to the recorder 45 to produce impressions on secondary record 10a distinctive in character and related in an absolutely predetermined time relation to the initial recording.

More particularly, each ring counter comprises ten tubes connected in cascade. For the purpose of simplicity, only one ring is shown in detail. It is to be noted that the output selector switch 251a in the ring counter 251 may be set at any one of ten output positions. If set on the zero position and tube 251c is initially conducting, the first pulse from gate 228 applied to the input bus 251b will appear directly through the output rectifier 251c and the output multivibrator 251d for application to the input bus 252b of the ring counter 252. If the switch 251a is set on the first or the No. 1 position, the second pulse applied to the input bus 251b will appear on the input bus 252. Operation of each of the successive ring counters is basically the same so that the setting of the selector switch 251a controls the 0.001 second record times. Switch 252a controls the 0.01 second record times. Switch 253a controls the 0.1 second record times, and the ring counter 254 is actuated in intervals of 1 second.

When the filtering action is optimum in the amplifiers 215–220, the selector switches 251a and 252a are set to their zero position so that upon successive cycles of playback of record 210 pulses will be applied to channels 258 and 259 every 0.01 second and every 0.1 second, respectively, after the initial marker renders the gate 228 conductive.

The pulses on busses 252b and 253b, occurring at the rate of 100 per second and 10 per second, respectively, are utilized to impress timing markers on the secondary record 10a. These pulses are inverted in channels 258 and 259 by means not shown but well known in the electronic art. A single stage of amplification, for example, may be used. The pulses are applied to the recorder 45 at points 258a and 258b. A circuit particularly suitable for producing the timing markers is illustrated in Fig. 8.

In Fig. 8 the 0.01 second pulses appearing at terminal 258a are applied to the input points 260 of a multivibrator 261. Multivibrator 261 includes tube 262 whose control grid is connected by way of condenser 263 and rectifier 264 to terminal 260. The cathode of tube 262 is connected directly to the cathode of tube 265 and then is connected to ground by way of a resistor-condenser combination 266. The anode of tube 262 is connected by way of circuit 267 to the control grid of tube 265, and the control grid of tube 262 is connected to the anode of tube 265 by way of circuit 268.

The control grid of tube 265 is connected by way of condenser 269 and rectifier 270 to terminal 260. The anode of tube 262 is connected by way of resistor 271 to the positive terminal of a battery 272. Similarly, the anode of tube 265 is connected to the battery 272 by way of resistor 273.

Thus the 0.01 second pulses are applied to the grids of both tubes 262 and 265. However since tubes 262 and 265 are alternately conductive, pulses will appear at intervals of 0.02 second on each of the anodes thereof in response to alternate 0.01 second pulses applied to their grids. The pulses from tube 262 are applied by way of condenser 275 and resistor 276 to the grid of an amplifier tube 277.

The anode of amplifier 277 is coupled by way of condenser 278 and resistor 279 to the control electrode of the gas discharge tube 280. While other thyratron type tubes may be suitable for operation as tube 280, a preferred type of gas discharge tube, the type OA5, has inherent in its operation a greater impedance discontinuity when fired and thus provides a larger output pulse than other well known thyratrons. As illustrated, signals from tube 277 are applied to the suppressor grid of tube 280. The screen grid in accordance with preferred operation of type OA5 tube is floating and the control grid is connected by way of resistor 283 to a point of positive potential. The anode of tube 280 is connected through the primary of a pulse transformer 281 and a condenser 282 to ground. Tube 280 normally is non-conducting. During the periods that it is extinguished, current flows from battery 284 connected in the anode circuit of tube 280 through the primary of transformer 281 to charge condenser 282. When a pulse is applied to the suppressor grid of tube 280, condition is initiated therein and condenser 282 discharges therethrough producing a high voltage pulse in the secondary of transformer 281.

The secondary of pulse transformer 281 is connected to ground and to the igniter electrode 285 of a gas tube 286. Electrode 287 of tube 286 is connected to ground and also by way of condenser 288 to the electrode 289. Electrode 289 is connected by way of resistor 290 to the B+ terminal of a suitable voltage source such as battery 284.

In a similar manner the anode of tube 265 is connected through triode 291, pentode 292 and pulse transformer 293 to a second gas or flash tube 294. When a pulse appears on the igniter electrodes of tubes 286 and 294, condensers 288 and 288a discharge through their respective tubes to produce short brilliant flashes of light. The pulsed light is focused by a suitable optical system (not shown but provided in the recorder 45) to project an extremely narrow beam of short time duration onto photographic recording film comprising record 10a. By way of example, tubes 286 and 294 may be of the type manufactured and sold under the trade name Strobatron, type SA–309, by Sylvania Electric Products, Inc., Emporium, Pennsylvania.

In operation, tube 289, in response to 0.01 second pulses applied at terminal 260, will be energized at 0.02 second intervals. Tue 294, in response to application of 0.01 second pulses at terminal 260, will be energized at 0.02 second intervals but delayed a 0.01 second interval from the energization of tube 286. Thus tubes 286 and 294 flash alternately to produce a series of 0.01 second markers on the recording medium in recorder 45.

The pulses occurring at intervals of 0.1 second and appearing on channel 259 are applied by way of condenser 295 and resistor 296 to the grid of triode 277 and by way of condenser 297 and resistor 298 to the grid of tube 291 to provide simultaneous energization of both flash tubes 286 and 294 at 0.1 second intervals.

As a result of operation of the system of Fig. 8, a record 10a, Fig. 1, is produced which has a first timing line corresponding with the record zero instant or initial timing marker and which has relatively light timing lines every 0.01 second thereafter with heavier or reinforced lines every 0.1 second. For clarity, only the ends of the 0.01 timing lines have been shown. Not only does the record have the distinctive characteristics above noted, but such timing lines occur in the same relation with respect to the seismic information on the new record as occurrence of the original seismic event in time.

The foregoing description includes the various individual steps involved in a single cycle of operations, or, stated otherwise, during a single cycle of travel of the record 210 past the transducer 213. If record 210 is a continuous loop, the display on oscilloscope 222, Fig. 7, may be made to be a repetitive phenomena synchronized through the above described timing system with the repetitive production of signals from record 210. To provide for resetting the circuits at the end of each display period and facilitate repeated presentation of recorded data, a pulse is applied from the oscilloscope 222 to the control grid of tube 241, Fig. 6. The horizontal sweep voltage from oscilloscope 222 is utilized. A pulse is derived, by means not shown, from the sweep voltage coincident with the "flyback" or return of the cathode beam to its zero position. Circuit 300 serves to transmit this pulse to the control grid of tube 241. Tube 241 is then rendered non-conductive, and conduction through tube 235 is initiated, closing gate 228.

Coincident with the initiation of conduction in tube 235, the anode voltage on all tubes in the ring counters 251–254 is momentarily reduced as explained below to extinguish all the counter tubes. Thereafter the zero tube in each of the rings is rendered conductive and ready for a succeeding cycle of operations.

More particularly, the anode voltage on the ring counters is derived from a suitable source such as the battery 301. Current for the ring counters flows from the positive terminal of battery 301 through resistor 302 and conductors 303 and 304. Conductor 304, shown connected only to the anodes of ring counter 251, will also be connected to the anodes of the tubes in the ring counters 252–254. For simplicity, the details of the remaining ring counter are omitted. The resistor 302, Fig. 6, is the plate load for a reset tube 306. Tube 306 is a gas filled pentode of high current capacity having its cathode connected directly to ground. When the anode of tube 241 suddenly goes positive as in its non-conducting state, the grid of tube 306 is raised to a positive potential to initiate conduction therein. Initiation of high current flow through tube 306 abruptly reduces the voltage at its anode to a low level, i.e. to approximately 8 volts for conventional thyratrons. The latter voltage appearing on conductor 304 and applied to the anodes of each of the tubes in the ring counters is insufficient to maintain conduction therein. Condenser 307, initially charged to the potential of battery 301, discharges through tube 306 and controls the interval that tube 306 is conducting. The conduction time is determined by the time constant of the condenser discharge circuit comprising the condenser 307, resistor 308 and the anode-cathode impedance of tube 306. Thus tube 306 is extinguished shortly after it is fired. As condenser 307 recharges, the voltage on conductor 304 rises to the potential on the anode of tube 306 and is then sufficient for subsequent operation of the ring counters.

Not only must all of the tubes of the ring counters be extinguished at the end of each cycle of display on the cathode ray oscilloscope, as above described, but in addition the zero tube in each ring must be fired in preparation for a succeeding cycle of operation. To this end the change in voltage of the anode of tube 306 is applied, after a suitable time delay in the circuit 310 to the grid of tube 311.

The gas diode 310a, a neon tube having a breakdown potential somewhat above the voltage across tube 306 when it is conducting, provides a shunt for modulation pulses appearing on conductor 304 when the ring counters are in operation and when tube 306 is non-conducting. However, when tube 306 fires, tube 310a, which when conducting presents a very low impedance, is extinguished thereby giving to the resistors and condensers in the circuit 310 the control of the time delay of transmission of a pulse to the tube 311.

The resultant change in anode voltage of tube 311 is coupled by way of condenser 312, rectifier 313 and resistor 314 to the screen grid of the zero tube in ring counter 251. Similarly, the output of tube 311 is coupled through rectifier-resistor combination 315 to the zero tube of ring counter 252 and by way of the rectifier-resistor circuit 316 to the zero tube of ring counter 253. In a similar manner the zero tube of ring counter 254 is fired for a succeeding cycle. Thus application of the single pulse from tube 311 places all of the ring counters in condition for operation starting from their zero tube.

It will now be apparent that the single cycle of operations above discussed in detail will be repeated cyclically as the record element 210 is driven past the transducer 213 repeatedly to produce the three sets of output signals, the signals corresponding with the recorded seismic waves, with the constant frequency time base signal and with the timing marker pulse in order to present on the face of the oscilloscope 222 a pictorial representation of such signals, thereby permitting manipulation of the filtering characteristics of amplifiers 215–220 to produce a record of optimum filtering characteristics. If the sweep on the oscilloscope 222 is caused to be relatively slow and the selector switches on all of the ring counters are set on zero position, the entire record may be displayed on the oscilloscope. If the sweep is caused to have a much higher velocity, the selector switches on the ring counters may then be manipulated to present in detail selected short sections of the record on the oscilloscope. When an operator is satisfied as to the filtering action, the selector switches on the ring counters 251 and 252 will be set on zero positions so that following the timing marker output pulses will be applied to terminal 258a every 0.01 second and will be applied to terminal 259a every 0.1 second. Thus the original seismogram 10, Fig. 1, is repeatedly scanned and exhibited on the display means. On a selectable cycle of display of the record, the operator may manually close an energizing circuit to the recorder 45 and maintain it closed for a period long enough to record the entire duration of the displayed or exhibited signals on the new or secondary seismogram 10a.

The foregoing description sets forth in detail a re-recording system based upon the existence of a primary record preferably of magnetic character for the production of secondary records on photographic paper having variable amplitude traces. It will now be apparent that the secondary records themselves may be phonographically reproducible in form and that other modifications may be made without departing from the present invention. Operation has been described as specifically relating to an initial marker repeatedly referred to as a time break signal generated in time coincidence with the generation of seismic waves. An initial marker of this character is almost universally employed in connection with reflection seismic exploration. However as is well understood by those skilled in the art, an initial marker other than a time break signal may be utilized, so long as the time relationship of such initial marker to the instant of generation of the seismic waves is well known or can readily be calculated. For example, an "uphole" geophone sometimes is utilized in place of a time break for certain purposes and as such may be utilized in place of the time break as the initial marker herein described. Further, in connection with refraction seismograph exploration, first arriving energy often is used as an initial marker and as such may serve in that sense for use as herein described. Other such modifications may now suggest themselves to those skilled in the art, and it is intended to cover such modifications as fall within the scope of the appended claims.

We claim:

1. A system for studying a phonographically reproducible record of a transient wave having associated therewith a periodic time base signal and an initial marker positioned in predetermined time relation to the generation of said transient which comprises means including transducer means for cyclically scanning said record repeatedly to produce on a scaled time base a first signal corresponding to said transient, a second signal corresponding to said periodic time base signal, and a third signal coincident and corresponding with said initial marker, monitoring means including a signal channel and a control channel, circuit means interconnecting said transducer means and said signal channel for application to said monitoring means of repeated cycles of said first signal, a normally non-conductive unit having output terminals and connected at its input to said transducer means and responsive to said second signal, circuit means interconnecting said transducer means and said normally non-conductive unit and responsive to said third signal for rendering conductive said normally non-conductive unit in each cycle of said first signal at a time coincident with said timing marker for transmission therethrough of said second signal, a pulse selective circuit connected between said output terminals and said control channel for applying to said monitoring means a selected cycle of said second signal for actuating said monitoring means to render it responsive to said first signal, and means operable in the interval following said selected cycle of said second signal and prior to the beginning of the next succeeding cycle of said first signal to render said unit non-conductive.

2. A system for studying a phonographically reproducible record of a transient wave having associated therewith a periodic time base signal and an initial marker having a predetermined time relation to the generation of said transient which comprises means including transducer means for cyclically scanning said record repeatedly to produce on a scaled time base a first signal corresponding to said transient, a second signal corresponding to said periodic time base signal, and a third signal coincident and corresponding with said initial marker, monitoring means having a signal channel and a control channel, circuit means interconnecting said transducer means and said signal channel for application to said monitoring means of repeated cycles of said first signal, a normally non-conductive unit having output terminals and connected at its input to said transducer means and responsive to said second signal, circuit means interconnecting said transducer means and said normally non-conductive unit and responsive to said third signal for rendering conductive said normally non-conductive unit in each cycle of said first signal at a time coincident with said third signal for transmission therethrough of said second signal, a pulse selective circuit connected between said output terminals and said control channel for applying to said monitoring means a selected cycle of said second signal for actuating said monitoring means to render it responsive to said first signal, and means responsive to said monitoring means for rendering said unit non-conductive in the interval following said selected cycle of said second signal and prior to the beginning of the next succeeding cycle of said first signal.

3. A system for studying a record of a transient wave occurring in time following an initial instant which comprises means for cyclically producing a voltage which varies in accordance with said transient, means for generating an initial marker coincident and corresponding with said instant, a monitoring means having a signal channel and a control channel, means for applying said transient to said signal channel, a normally blocked counter system including a source of periodic signals whose frequency is higher in a predetermined relation than the frequency of cyclic reproduction of said transient, said counter also including a plurality of decimal counters characterized by fundamental periods differing one from the other by factors of ten and adjustable means in each counter for selecting any digit between one and ten, means responsive to said initial marker for energizing said counter system, means for connecting said counter system to said monitoring means to apply a selected cycle of said periodic signal thereto to initiate presentation of the portion of said transient beginning at a time determined by said adjustable means of said counters, and means for applying to said counter system a pulse in the interval between said single cycle and the beginning of the next succeeding cycle of said transient for resetting said counter system.

4. A system for studying a phonographically reproducible record of a transient wave having associated therewith a periodic time base signal and an initial marker positioned in predetermined time relation to the generaton of said transient which comprises means including transducer means for cyclically scanning said record repeatedly to produce on a scaled time base a first signal corresponding to said transient, a second signal corresponding to said periodic time base signal, and a third signal coincident and corresponding with said initial marker, montoring means including a signal channel and a control channel, circuit means interconnecting said transducer means and said signal channel for application to said monitoring means of repeated cycles of said first signal, a normally non-conductive unit having output terminals and connected at its input to said transducer means and responsive to said second signal, circuit means interconnecting said transducer means and said normally non-conductive unit and responsive to said third signal for rendering conductive said normally non-conductive unit in a first cycle of said first signal at a time coincident with said initial marker for transmission therethrough of said second signal, a plurality of gas tubes each having a firing terminal connected to an adjacent tube to form a closed loop, a signal input circuit for said loop connected to said output terminals and to said firing terminals for shifting conduction from one tube to another in response to said second signal, a source of anode supply voltage having a positive terminal and a negative terminal, an impedance means connected to said positive terminal and to the anodes of all of said gas tubes, a thyratron having a grid, a cathode connected to said negative terminal and an anode connected to the anodes of said gas tubes, a condenser connected between said anodes and said negative terminal for accumulating a charge from said source, an output pulse selector having a zero output position connected to the cathode of the first of said gas tubes and a plurality of output positions connected respectively to the cathodes of the remaining gas tubes for transmitting to said control channel a pulse spaced an interval after said initial marker determined by the frequency of said second signal and the setting of said output pulse selector to render said monitoring means responsive to said first signal, means for applying a reset pulse to said normally non-conductive unit and to said grid in predetermined time relation to said selected pulse for discharge of said condenser through said thyratron in a period depending upon the time constant of the condenser-thyratron circuit to lower the voltage on the anodes of said gas tubes below their conduction voltage, a circuit connected between said anodes and the firing terminal of said first gas tube for transmission of a pulse produced in time-coincidence with said reset pulse, and means in said last named circuit for delaying said last named pulse in a time interval greater than said period to fire said first tube preparatory for a second cycle of said first signal.

5. A system for studying a phonographically reproducible record of a transient wave having associated therewith a periodic time base signal and an initial marker positioned in predetermined time relation to the generation of said transient which comprises means including transducer means for cyclically scanning said record repeatedly to produce on a scaled time base a first signal corresponding to said transient, a second signal corresponding to said periodic time base signal, and a third signal coincident and corresponding with said initial marker, monitoring means including a signal channel and a control channel, circuit means interconnecting said transducer means and said signal channel for application to said monitoring means of repeated cycles of said first signal, a normally non-conductive unit having output terminals and connected at its input to said transducer means and responsive to said second signal, circuit means interconnecting said transducer means and said normally non-conductive unit and responsive to said third signal for rendering conductive said normally non-conductive unit in a first cycle of said first signal at a time coincident with said timing marker for transmission therethrough of said second signal, a plurality of gas tubes each having a firing terminal connected to an adjacent tube to form a closed loop, a signal input circuit for said loop connected to said output terminals and to said firing terminals for shifting conduction from one tube to another in response to said second signal, a source of anode supply voltage having a positive terminal and a negative terminal, an impedance means connected to said positive terminal and to the anodes of all of said gas tubes, a thyratron having a grid, a cathode connected to said negative terminal and an anode connected to the anodes of said gas tubes, a condenser connected between said anodes and said negative terminal for accumulating a charge from said source, an output pulse selector having a zero output position connected to the cathode of the first of said gas tubes and succeeding output positions connected respectively to the cathodes of succeeding gas tubes for transmitting to said control channel a pulse spaced an interval after said initial marker determined by the frequency of said second signal and the setting of said output pulse selector to render said monitoring means responsive to said first signal, means for applying a reset pulse to said normally non-conductive unit and to said grid in predetermined time relation to said selected pulse for discharge of said condenser through said thyratron in a period depending upon the time constant of the condenser-thyratron circuit to lower the voltage on the anodes of said gas tubes below their conduction voltage, a reset circuit connected between said anodes and the firing terminal of said first gas tube for transmission of a pulse produced in time-coincidence with said reset pulse, means in said last named circuit for delaying said last named pulse in time interval greater than said period to fire said first tube preparatory for a second cycle of said first signal, and a voltage sensitive impedance element non-conductive at the conduction-voltage of said thyratron and conductive at the conduction voltage of said gas tubes connected in circuit between said anodes and ground and effective to shunt all pulses in said anode circuit other than said reset pulse.

6. A system for studying and for recording on a recording medium seismic signals initially recorded together with a timing signal on a phonographically reproducible record which comprises translating means coupled to said record for generating electrical signals corresponding with said seismic signals and for producing pulses from said timing signal at a rate related to the time duration of said seismic signals by a scaling factor, a visual display means, a recording means adapted to drive said recording medium past a recording point, a transmission channel for said electrical signals connected between said translating means and both said display means and said recording means, circuit means operable in response to said pulses for applying a timing function to said display means and to said recording means, said circuit means including adjustable means for selectively applying said timing function to said display means and to said recording means coincident with a selected one of said electrical pulses within the period corresponding to said time duration.

7. A system for studying and for recording on a recording medium seismic signals initially recorded together with a timing signal on a phonographically reproducible record which comprises translating means coupled to said record for generating electrical signals corresponding with said seismic signals and for producing pulses from said timing signal at a rate related to the time duration of said seismic signals by a scaling factor, a visual display means, a recording means adapted to drive said recording medium past a recording point, a transmission channel for said electrical signals connected between said translating means and both said display means and said recording means, a timing circuit interconnecting said translating means and said display means and said recording means, said timing circuit including means actuatable in response to said pulses for impressing a space scale on said recording medium as it is driven past said recording point, and means actuatable in response to a selectable one of said pulses for initiating the operation of said display means.

8. A system for re-recording a phonographically reproducible record of seismic waves together with an initial marker recorded coincident with generation of said seismic waves and with a time base signal which comprises signal producing means responsive to said record having three output signals respectively corresponding to the record of said seismic waves, said time base signal and said initial marker, a transmission channel for the first of said three output signals, a recorder having a recording medium driven past a recording point and connected to said transmission channel for impressing the first of said signals on said medium, a normally non-conductive channel for the second of said three output signals, a circuit responsive to the third of said three output signals for rendering conductive said normally non-conductive channel, and means connected between said normally non-conductive channel and said recorder for applying the second of said three output signals to said recording medium at said recording point in a space relation with respect to the first of said signals as said time base is related to said seismic signals.

9. A system for re-recording a phonographically reproducible record of seismic waves together with an initial marker recorded coincident with generation of said seismic waves and with a time base signal which comprises signal producing means having three output signals respectively corresponding with the record of said seismic waves, said time base signal and said initial marker, amplifying means for the first of said three output signals having a predetermined amplitude-frequency characteristic for producing modified signals, a recorder connected to said amplifying means for producing a record of said modified signals, a normally non-conductive channel for the second of said three output signals, a circuit responsive to the third of said three output signals for rendering conductive said normally non-conductive channel, and means connected between said normally non-conductive channel and said recorder for applying the second of said three output signals thereto related to said modified signals as said time base is related to said seismic signals.

10. A system for re-recording a phonographically reproducible record of seismic waves together with an initial marker recorded coincident with generation of said seismic waves and with a time base signal which comprises signal producing means having three output signals, the first corresponding with the record of said seismic waves, the second comprising electrical pulses repeated in time in accordance with and derived from the record of said time base signal, and the third a control pulse corresponding with said initial marker, a recorder having a recording medium driven past a recording point and a pair of light sources adjacent said recording point, a transmission channel connected to said recorder and to said signal producing means responsive to said first output signal for recording said first signal on said recording medium, a normally non-conductive channel for said second output signal, a circuit responsive to said third output signal connected to said normally non-conductive channel to render it conductive coincident with generation of said third signal, and frequency dividing means for said electrical pulses connected between said normally non-conductive channel and said light sources for applying pulses at a first rate alternately to said pair of light sources and for applying pulses at a selected sub-rate simultaneously to both of said light sources for exposing at low and high intensity respectively portions of said recording medium successively positioned at said recording point as a scale related to said first signal impressed on said medium as said time base is related to said seismic signals.

11. A system for re-recording a phonographically reproducible record of seismic waves together with an initial marker recorded coincident with generation of said seismic waves and with a time base signal which comprises signal producing means having three output signals, the first corresponding with the record of said seismic waves, the second comprising electrical pulses repeated in time in accordance with and derived from the record of said time base signal, and the third a control pulse corresponding with said initial marker, a recorder having a recording medium driven past a recording point and a pair of transducers adjacent said recording point, a transmission channel connected to said recorder and to said signal producing means responsive to said first output signal for recording said first signal on said medium, a normally non-conductive channel for said second output signal, a circuit responsive to said third output signal connected to said normally non-conductive channel to render it conductive coincident with generation of said third signal, and frequency dividing means for said electrical pulses connected between said normally non-conductive channel and said transducers for applying pulses at a first rate alternately to said transducers and for applying pulses at a selected sub-rate simultaneously to both of said transducers for impressing indications on said medium at low intensity and high intensity the portions successively positioned at said recording point as a scale related to said first signal impressed on said medium as said time base is related to said seismic signals.

12. A system for producing a space scale on a recording medium as it is driven past a recording point which comprises a pair of recording transducers adjacent said recording point, means for producing control pulses repeated in time, circuit means for applying said pulses first to one and then to the other of said transducers to impress low intensity indications at points of a first spacing on said medium as they are successively positioned at said recording point, pulse dividing means responsive to each of said control pulses for producing output pulses therefrom at a selected sub-multiple of the frequency of said control pulses, and means for applying said output pulses to both of said transducers simultaneously to impress relatively high intensity indications at points of a second spacing on said medium related to said first spacing as said sub-multiple is related to the frequency of said control pulses distinctively to mark said scale.

13. A system for producing a space scale on a photographic film as it is driven past a recording point which comprises a pair of light sources adjacent said recording point, means for producing control pulses uniformly repeated in time, circuit means for applying said pulses first to one and then to the other of said light sources to expose at low intensity points of a first spacing on said film as they are successively positioned at said recording point, pulse dividing means responsive to each of said control pulses for producing output pulses therefrom at a selected sub-multiple of the frequency of said control pulses, and means for applying said output pulses to both of said sources simultaneously to expose at relatively high intensity points of a second spacing on said film related to said first spacing as said sub-frequency is related to the frequency of said control pulses distinctively to mark said scale.

14. In a system in which electrical control pulses are repeated in time for producing a space scale on a photographic film as it is driven past a recording point, the improvement which comprises a pair of light sources adjacent said recording point, a circuit for actuating first one and then the other of said sources in response to said control pulses for producing light flashes coincident with each of said control pulses to expose at low intensity points on said film successively positioned at said recording point to impress a scale on said film, an electrical circuit responsive to each of said pulses for producing output pulses recurring at a selected sub-multiple of the frequency of said control pulses, and means for applying said output pulses to both of said sources for simultaneously energizing both of said sources at said sub-frequency to expose said film at a relatively high intensity distinctively to mark said scale in a space relation corresponding with the time occurrence of said output pulses.

15. A system for producing a space scale on a photographic film as it is driven past a recording point which comprises a pair of light sources adjacent said recording point, a source of control pulses, a circuit for actuating first one and then the other of said sources in response to said control pulses for producing light flashes coincident with each of said control pulses to expose at low intensity points on said film successively positioned at said recording point to impress a scale on said film, a pulse dividing network responsive to each of said control pulses for producing output pulses at a selected integral sub-multiple of the frequency of said control pulses, and means for applying said output pulses to both of said sources for simultaneously energizing said sources coincident with each of said output pulses to expose said film at a relatively high intensity distinctively to mark said scale at points spaced with respect to said points exposed at low intensity as said sub-multiple is related to the frequency of said control pulses.

16. A system for producing a space scale on a photographic film as it is driven past a recording point which comprises a pair of light sources adjacent said recording point, a source of electrical control pulses, a circuit for actuating first one and then the other of said sources in response to said control pulses for producing light flashes coincident with each of said control pulses to expose at low intensity the points on said film successively positioned at said recording point to impress a scale on said film, a decade pulse dividing network responsive to each of said pulses for producing output pulses recurring at one-tenth the frequency of said control pulses, and means for applying said output pulses to both of said sources for simultaneously energizing both of said sources coincident with every tenth control pulse to expose said film at a relatively high intensity distinctively to mark said scale in a space relation corresponding with the time occurring of said output pulses.

17. A system for producing a space scale on a photographic film as it is driven past a recording point which comprises a pair of light sources adjacent said recording point, two control tubes connected to said light sources, a source of control pulses, switching means interconnecting said source and said control tubes and actuated in response to said control pulses for transmission of succesive control pulses first to one of said control tubes and then to the other through said switching means to expose at low intensity points on said film sucessively positioned at said recording point, and a pulse dividing network connected between said source of control pulses and both of said control tubes for applying to both of said tubes simultaneously output pulses recurring at a selected sub-harmonic of the frequency of said control pulses to expose at high intensity points on said film spaced in the same relation as points exposed at low intensity as said sub-harmonic bears to its fundamental.

18. A system for impressing on a recording medium seismic signals initially recorded with a timing signal on a phonographically reproducible record which comprises translating means coupled to said record for generating electrical signals corresponding with said seismic signals and for producing electrical pulses at a time rate related to the time duration of said seismic signals by a scaling factor, a recorder including means for driving said recording medium past a recording point, means including a pulse counting circuit connected to said translating means and actuated in response to said electrical pulses for impressing a space scale on said recording medium as it is driven past said recording point, and a transmission channel connected between said translating means and said recorder for impressing said electrical signals on said recording medium as it is driven past said recording point in a space relation related to said time duration by said scaling factor.

19. A system for impressing on a recording medium seismic signals initially recorded with a timing signal on a phonographically reproducible record which comprises translating means coupled to said record for generating electrical signals corresponding with said seismic signals and for producing electrical pulses at a time rate related to the time duration of said seismic signals by a scaling factor, a recorder including means for driving said recording medium past a recording point, a pulse counting circuit connected to said translating means, light-pulsing means connected to said counting circuit actuated in response to selected ones of said electrical pulses for impressing a space scale on said recording medium as it is driven past said recording point, and a transmission channel connected between said translating means and said recorder for impressing said electrical signals on said recording medium as it is driven past said recording point in a space relation related to said time duration by said scaling factor.

20. A system for impressing on a recording medium seismic signals initially recorded with a timing signal on a phonographically reproducible record which comprises translating means coupled to said record as to permit relative movement therebetween for generating electrical signals corresponding with said seismic signals and for producing electrical pulses at a time rate related to the time duration of said seismic signals by a scaling factor, a recorder including means for driving said recording medium past a recording point, means including a pulse counting circuit connected to said translating means and actuated in response to said electrical pulses for impressing on said recording medium as it is driven past said recording point a space scale dependent upon said timing signal on said phonographically reproducible record regardless of the speed of said recording medium or the relative movement between said phonographically reproducible record and said translating means, and a transmission channel connected between said translating means and said recorder for impressing said electrical signals on said recording medium as it is driven past said recording point in a space relation related to said time duration by said scaling factor.

21. A system for studying and for recording on a recording medium seismic signals initially recorded together with a timing signal on a phonographically reproducible record which comprises translating means coupled to said record for generating electrical signals corresponding with said seismic signals and for producing pulses from said timing signal at a rate related to the time duration of said seismic signals by a scaling factor, a visual display means, a transmission channel for said electrical signals connected between said translating means and said display means, a timing circuit interconnecting said translating means and said display means, said timing circuit including means operable in response to a selectable one of said pulses for initiating the operation of said display means visually to show a portion of said electrical signals, recording means adapted to drive said recording medium past a recording point, said recording means being connected to said channel and to said timing circuit to receive said electrical signals and timing pulses to impress on said recording medium the space scale, and means for initiating operation of said recording means to record all of said electrical signals while a selected fraction thereof appears on said display means.

22. A system for clarifying seismic reflections appearing in a seismogram recorded on a phonographically reproducible record together with a timing signal comprising visual means for displaying seismic signals, means including a transducer for detecting said seismic signals and applying them to said visual means, control means for said visual means operable by said timing signals for displaying that portion of said seismogram including one of said reflections, means for modifying the seismic signals detected by said transducer for bringing into bolder relief the nature of said reflection, and means for recording said detected seismic signals to produce a new seismogram while observing on said visual means the clarified reflection to be studied.

23. A system for clarifying seismic reflections appearing on a seismogram recorded on a phonographically reproducible record together with a timing signal comprising visual means for displaying seismic signals, and means including a transducer for detecting said seismic signals and for applying them to said visual means, control means for said visual means including a pulse counting system responsive to said timing signals and adapted to initiate in response to one of said pulses display of that portion of said seismogram including one of said reflections, means for varying selected frequency components of the seismic signals detected by said transducer for bringing into bolder relief the nature of said reflection, and means for recording said detected seismic signals to produce a new seismogram while observing on said visual means the clarified reflection to be studied.

24. A system for clarifying seismic reflections appearing on a seismogram recorded on a phonographically reproducible record together with a timing signal comprising cathode ray means for displaying seismic signals, and means including a transducer for detecting said seismic signals and for applying them to said cathode ray means to deflect said cathode ray in a first sense, control means for said cathode ray means including a pulse counting system responsive to said timing signals and adapted to initiate deflection of said cathode ray in a second sense in response to one of said pulses to display that portion of said seismogram including one of said reflections, means for modifying selected frequency components of the seismic signals detected by said transducer for bringing into bolder relief the nature of said reflection, and means for recording said detected seismic signals to produce a new seismogram while observing on said cathode ray means the clarified reflection to be studied.

25. A system for visually analyzing a seismogram of the phonographically reproducible type having timing impulses uniformly spaced lengthwise thereof which comprises means for generating a first set of electrical signals representative of the seismic data recorded on said seismogram and for generating a second set of electrical signals corresponding in number with the number of said timing impulses, means responsive to said second set of electrical signals for initiating a count of said timing impulses at a time bearing a predetermined relationship with respect to a reference point on said seismogram representative of the instant of generation of those seismic waves which were productive of the seismic data on said seismogram, visual display means, means for applying said first set of electrical signals to said display means, means operable when the count of said impulses reaches a predetermined value for initiating the production on said display means of subsequently occurring seismic data, means operable when the count of said impulses reaches a second predetermined value for terminating the display of said data by said display means, and timing means in said display means having a scanning time corresponding with the time interval scaled by the passage of the timing impulses intermediate said predetermined values.

References Cited in the file of this patent

UNITED STATES PATENTS

| | | |
|---|---|---|
| 2,424,622 | McClure | July 29, 1947 |
| 2,496,392 | Hasbrook | Feb. 7, 1950 |
| 2,594,731 | Connolly | Apr. 29, 1952 |
| 2,609,143 | Stibitz | Sept. 2, 1952 |
| 2,648,822 | Walter | Aug. 11, 1953 |
| 2,658,579 | Rieber | Nov. 10, 1953 |
| 2,672,944 | Minton | Mar. 23, 1954 |

OTHER REFERENCES

"The Cathode Ray Sound Spectroscope," in Journal of the Acoustical Society of America, September 1949, pp. 527–537.

"Frequency Analysis of Seismic Waves," in Geophysics, October 1952, pp. 721–738.

UNITED STATES PATENT OFFICE
CERTIFICATE OF CORRECTION

Patent No. 2,950,459                                                                August 23, 1960

George B. Loper et al.

It is hereby certified that error appears in the printed specification of the above numbered patent requiring correction and that the said Letters Patent should read as corrected below.

Column 4, line 27, for "relay" read -- rely --; line 67, for "appropirate" read -- appropriate --; column 5, line 5, for "filter" read -- filters --; line 65, after "15" insert a period; column 6, line 27, after "be" insert -- the --; column 9, line 71, for "anly" read -- any --; column 15, line 22, for "determins" read -- determine --; column 17, line 66, for "condition" read -- conduction --; column 18, line 19, for "Tue" read -- Tube --; column 21, line 59, for "montoring" read -- monitoring --; column 24, lines 65 and 66, for "channe" read -- channel --; column 26, lines 20 and 21, for "occurring" read -- occurrence --; column 28, line 40, after "visual" insert -- signal --.

Signed and sealed this 18th day of April 1961.

(SEAL)
Attest:

ERNEST W. SWIDER                                       DAVID L. LADD

Attesting Officer                                           Commissioner of Patents